July 3, 1934.  G. A. GUSTAFSON  1,964,941
STOCK PUSHER
Filed Jan. 22, 1932
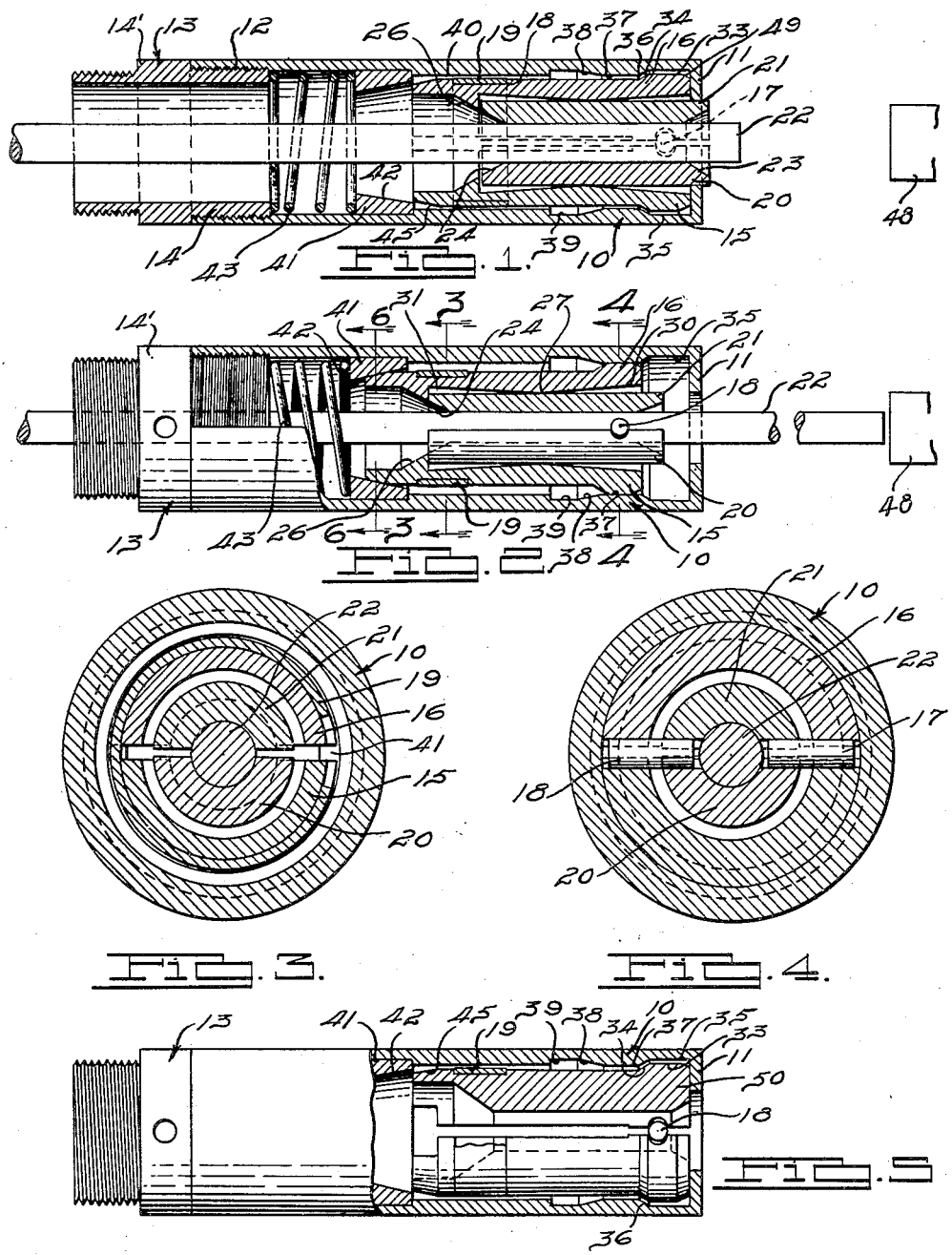
INVENTOR
Gustav Arthur Gustafson
BY
ATTORNEYS.

Patented July 3, 1934

1,964,941

UNITED STATES PATENT OFFICE 1,964,941

STOCK PUSHER

Gustav Arthur Gustafson, Detroit, Mich., assignor, by mesne assignments, to Thomas J. Nienhaus, Detroit, Mich.

Application January 22, 1932, Serial No. 588,185

20 Claims. (Cl. 29—62)

The invention relates to bar stock feeding devices, ordinarily known as stock pushers, and used particularly in automatic screw machines for moving the stock by increments into the machine.

In automatic screw machines, long bars of stock are fed at intervals through the machine by predetermined increments of length, governed by a stop for the end of the bar. Each increment of the bar constitutes the stock from which a screw, bolt or the like is to be manufactured, and after various operations are performed on the end increment of the bar, to form a screw, for example, the latter is severed from the remainder of the bar and then it is necessary to move the bar another increment and against the stop to bring the new end part of the bar into position to be operated on by the various devices utilized in foming the screw. In the industry, a device utilized to move the bar against the stop after each screw is formed and severed, is known as a stock pusher and ordinarily such device is intended to so operate, that it will move the bar in only one direction, until it abuts the stop. After the bar is so moved, a collet grips the bar, and the collet, bar and pusher rotate together while the screw is being formed.

A primary object of the present invention is to provide a stock pusher which is of such construction that it will readily accommodate bar stock sizes varying considerably in diameter. Accordingly, the stock pusher or parts thereof need not be changed and another or parts of a different size substituted therefor, when the bar stock size is to be changed within the limits of size which the pusher will accommodate. One disadvantage of conventional stock pushers is that they are not adapted to accommodate bar stock varying in size, and it is necessary to have various sizes of parts and to change the size of pusher for practically each variation in size of bar stock. This requires time, extra equipment and excessive shut down of the machine, all of which add to the manufacturing costs.

Another object of this invention is to provide a stock pusher which will reduce waste at the end of the stock bar to a minimum and enable using practically the entire length of the bar stock for making screws or bolts. It is important that the stock pusher grip the stock very closely to that end of the pusher next to the bolt or screw forming devices and ordinarily a considerable final end portion of the bar is wasted because the ordinary type of stock pusher is not capable of gripping the bar close to that end of the pusher next to the screw or bolt forming devices.

It is another object of the invention to provide a stock pusher which will not mar or scratch the bar stock. This is quite important because the ordinary stock pushers used, scratch and mar the stock passing therethrough to such extent that the latter is weakened and endangered to the formation of cracks therein.

Another object of the invention is to provide a stock pusher of such character that the bar stock may readily be inserted therein by hand, even though burrs are present on the end of the stock, and it is not necessary to drive the stock into the pusher. In using conventional stock pushers, it has been necessary to chamfer the end of the stock before inserting it into the pusher, particularly when the stock had burrs thereon, and usually necessary to drive it through the pusher. This required extra and more tedious labor, as well as time, again adding to the manufacturing costs; moreover, frequent parts of the pusher were broken in so forcibly inserting the bar stock, and this not only required expensive replacement, but required more time and labor incidental thereto.

Another object of the invention is to provide a stock pusher having gripping pads for the bar stock which will constantly and substantially grip the stock throughout its length, and hence increase the gripping surface area and the durability of the pusher as well as prevent scratching or marring of the stock.

Another object of the invention is to provide a stock pusher having jaws of such character that the efficiency and effectiveness of the grip between the stock and the jaws will improve as the latter become worn. This is the reverse of th ordinary mechanism, which becomes less efficient and less effective as wear occurs.

Another object of the invention is to provide a stock pusher which will positively grip the bar stock and move it into the machine, but which will become ineffective for further moving the stock and actually release the latter if necessary, when the latter abuts the stop for example, in the machine, without subjecting the pusher to danger of breakage and without injuring the stock in any way. This type of pusher is very important where positive cam means for example are used for moving the pusher, in which event some overthrow of the pusher is desirable. Unless the pusher will readily accommodate this overthrow after the stock engages the stop, it is quite apparent that either the stock will be damaged or else the pusher parts will be subjected to great danger of breakage.

Another object of the invention is to provide an improved stock pusher which grips the stock and moves it in the feeding direction, but which so releases the stock when the pusher moves in the reverse direction, that it slides smoothly over the stock with practically no gripping action, until the pusher is again ready to feed the stock.

Various other objects of the invention will be apparent from the following description, the drawing relating thereto, and the claims hereinafter set forth.

For an understanding of certain embodiments of the invention reference may be had to the accompanying drawing, forming a part of the specification wherein:

Figure 1 is a longitudinal cross-sectional view of a stock pusher constructed according to one form of the invention, with a bar of stock initially disposed between the gripping pads in the pusher;

Fig. 2 is a view similar to Fig. 1, but illustrating the relation of the pusher parts and a smaller bar of work stock as the pusher is manipulated or moved longitudinally of the bar stock in the feeding direction;

Fig. 3 is a cross-sectional view on a larger scale taken substantially along the line 3—3 of Fig. 2;

Fig. 4 is a cross-sectional view on a larger scale taken substantially along the line 4—4 of Fig. 2;

Fig. 5 is a fragmentary cross-sectional view generally similar to that shown by Fig. 1, but illustrating a stock pusher constructed according to another form of the invention.

Fig. 6 is a cross-sectional view taken substantially along line 6—6 of Fig. 2.

Referring to Figs. 1 and 2, the stock pusher illustrated comprises a sleeve 10, having at one end an inwardly directed annular flange 11, and at its other end a threaded inner peripheral portion 12. The threaded portion 12 of the sleeve 10 is adapted to be connected to a coupling 13 having a threaded portion 14 threaded into the portion 12, and an annular shoulder portion 14' adapted to engage the end of the sleeve. The opposite end of the coupling is exteriorly threaded and is adapted to be connected to a moving part of an automatic screw machine or other device, for the purpose of operating the stock pusher.

Referring now additionally to Figs. 3 and 4, a pair of equalizing jaws 15 and 16 are disposed in the sleeve 10 adjacent the end flange 11, and such jaws are generally of semi-cylindrical character. The ends of the jaws adjacent the flange 11, are connected by means of diametrically opposed pins 17 and 18, disposed in openings formed by complementary cut-out recesses in the edge walls of the jaws. Adjacent their opposite ends the jaws have complementary annular grooves in their outer surfaces, and in this groove a split contractile band spring 19 is provided which normally tends to hold the adjacent edges of the jaws together. Between the jaws gripping pads 20 and 21 are provided which are adapted to grip a bar of stock 22 when the latter extends through the feed pusher. The gripping pads 20 and 21 are of substantially cylindrical character, but have countersunk end faces 23 and 24 at opposite ends to facilitate moving the bar 22 into the space between the pads.

The pads 20 and 21 are provided with openings for the pins 17 and 18 as shown clearly by Fig. 4. In this connection it may be stated that the pins 17 and 18 are provided primarily for the purpose of maintaining the jaws and gripping pads so assembled that they will move together longitudinally in the sleeve 10 and to prevent the gripping pads from falling out of the sleeve or otherwise separating from the jaws except when the pins are removed.

In the particular construction illustrated, the inner surfaces of the gripping pads are substantially semi-cylindrical and are adapted to engage the work piece 22 which is in the form of a round rod, substantially throughout their length. It, of course, is to be understood that the work piece may be polygonal or of other shape and the gripping surfaces of the pads may be of similar character, or in other words, the gripping surfaces of the pads may be changed to accommodate the different shape of the work. At the left end of the gripping pads, the jaws 15 and 16 on their inner peripheries have complementary circumferentially extending shoulders 26 which are tapered substantially in the same manner as the end faces 24 of the gripping pads so as to facilitate moving the end of the work piece into proper position between the pads.

The jaws are adapted to have substantially only circumferential line contact with the outer surfaces of the pads and, as shown in Fig. 2, this line contact is indicated at 17. While the line contact might be obtained in more than one way, it is preferred to have the outer surfaces of the gripping pads substantially cylindrical and the adjacent inner peripheral surfaces of the jaws provided with slightly conical outer surface portions 30 and 31 which meet centrally to provide a circumferentially extending portion of smaller diameter adapted to engage the pads. Preferably, when no work piece is between the pads, the latter may pivot some in axial planes about the line contact 27, and hence the pins 17 and 18 loosely fit in the openings therefor. Moreover, when no work is between the pads, the spring 19 normally keeps the adjacent side edges of the jaws in contact, but such side edges diverge or separate toward the opposite ends of the jaws, so that they are spaced at the pin ends of the latter, and consequently the pins are slightly clamped in the jaw openings therefor.

The jaw members 15 and 16 adajcent the flange 11 on the sleeve 10, have outer peripheral portions shaped to provide an annular shoulder 33 of slightly larger diameter than the remaining body portions of the jaws, and this shoulder joins the latter portions through an axially inclined surface portion 34. The inner periphery of the sleeve adjacent this part of the jaws, has an annular recess 35 bounded at one end by the flange 11 and at its other end by a tapered surface 36 substantially complementary to the tapered surface 34 on the jaws. To the left of the tapered surface 36 on the sleeve, the latter has on its inner periphery a shoulder of reduced diameter indicated at 37 which has a substantially cylindrical surface. To the left of this shoulder the periphery is tapered at 38 and then merges into an annular recess 39 of substantially the same diameter as the recess 35 adjacent the flange 11. To the left of the recess 39 the sleeve has an elongated shoulder 40 of smaller diameter, which is of sufficient size to permit proper movement of the jaws in the sleeve. The shoulder 40 at its left end serves as an abutment for a collar 41 having an outer cylindrical surface substantially complementary to the inner peripheral surface of the sleeve at the left of the shoulder 40 and an inner conical surface 42 tapering away from the axis of the jaws as it approaches the ends of the latter. This collar abuts the shoulder 40 at least initially and is maintained in such position by a relatively strong spring 43 engaging at one end the left end of the collar, and at its other end, the threaded portion 14 of the coupling 13.

When the work piece 22 is not disposed between the pads, the jaws are contracted sufficiently that they can be moved into the sleeve 10 from the left end thereof past the surface 36 in the latter, it being understood that the coupling, spring and collar 41 will be removed when the jaws and pads are to be inserted. After the jaws and pads assembled with the pins 17 and 18 are disposed in the sleeve 10, the collar 41 and spring 43 are inserted in the sleeve and then the coupling is associated with the latter in the manner shown.

The left ends of the jaws have outer surfaces 45 tapering toward their ends and toward the jaw axis, at an inclination generally corresponding to the inclination of surface 42 of collar 41. However, as shown by Fig. 6, this outer surface 45 on each jaw is of larger diameter circumferentially midway between its side edges, so as to insure contact of the surface 45 with the collar surface 42, at a point substantially midway of the jaw side edges, while normally leaving the surface 45 at both sides of the contact, free from engagement with the collar. This arrangement facilitates proper movement of the jaws into the collar, and engagement of the latter with the jaws at proper points to move the latter toward each other in planes substantially perpendicular to the axis of pins 17 and 18.

The parts are so constructed and arranged in sleeve 10, that when the work piece 22 is initially inserted into the left end of the sleeve, and into engagement with the left end portions of the pads, the jaws and pads will be moved to the right until the jaws engage the end flange 11. When this occurs, the opposite ends of the jaws may be slightly to the right of the collar 41, and may, if necessary, move outwardly past the end face of the collar.

When the work piece 22 is inserted into the left end of the pusher, the following operation normally may occur. The end of the work piece will move the jaws and pads to the right until the jaws engage the end flange 11 on sleeve 10, and the jaw surfaces 26 and surfaces 24 on the pads, or the latter alone, will guide the work piece into position between the pads. As the work piece so moves, the left end parts of the pads may move outwardly from each other, as the pads rock about line contact 27. The pins 17 and 18 being loosely received in the pad openings, will not normally interefere with this movement of the pads. As the work piece continues to move between the pads, the latter naturally will tend to align themselves with the work piece, and as a result, outward movement or expansion of the pads as a whole, will occur. This will cause expansion of the jaws and since the left ends of the latter tend to contract more strongly than the right ends thereof, because of spring 19, the latter ends will expand more than the left ends.

When a small size of work piece is inserted, slight expansion of the left ends of the jaws will occur, and expansion of the right ends of the jaws ordinarily will move the shoulder 33 towards or even into recess 35. After the work piece is thus inserted and the apparatus is ready for use, mechanism is employed, as described previously, to move sleeve 10 to the right. As the sleeve moves to the right, the inertia of the work piece, will tend to keep it and the jaws stationary, and the sleeve surface 37 will ride over the shoulder 33. Initial movement of the surface over such shoulder will occur at about the time surface 45 on the jaws moves into the collar 42. In the case of the small size of work piece, as described, the shoulder 33 and sleeve surface 37 will have relative positions as shown in Fig. 2, when the collar 41 has so engaged and moved the jaws, that the pads properly grip the work piece. Then continued movement of the sleeve will cause movement of the work piece, it being understood that the collar normally will not move in the sleeve against the spring 42 during movement of the work piece.

When a larger size of work piece is initially inserted into the pusher, the shoulder 33 ordinarily will be pushed farther toward or into the recess 35, and the left ends of the jaws will be also expanded to a greater extent. When the sleeve is moved to the right, the shoulder 33 on the jaws will again ride over the sleeve surface 37, it being apparent that the tapers 34 and 36 may avoid binding as well as cause slight expansion of the left ends of the jaws. At about the same time, the shoulder 33 engages surface 37, the surfaces 45 may engage the collar surface 42. Hence it is apparent that the larger size of work piece will be clamped between the pads with less relative movement of the jaws and sleeve.

Should a burr be present on any size of work piece, greater expansion of the jaws in inserting the work piece, is necessary. Under this set of circumstances, the shoulders 33 may move still farther into the recess 35, and if necessary, the left ends of the jaws may move outwardly past the right end of collar 41. After the burr has passed through the pads, the latter and jaws will contract to normal positions depending on the size of the work piece.

It is apparent that initial movement of the bar stock into the pusher may cause a varied movement of the shoulders 33 toward or into recess 35 depending on the size of bar stock and strength and location of spring 19. Moreover the expansion of the left ends of the jaws may vary under such varying conditions. It is possible to have the shoulders 33 engage the base of recess 35 when any size of bar stock is inserted, in which event the expansion and subsequent contraction of the left ends of the jaws would vary according to size of bar stock.

It is possible to have the expansion of the shoulders 33 lessened when the bar stock is inserted so that they do not move as much toward or into the recess 35. In any event, the final clamping action preferably is obtained by engagement of the collar 41 with the jaws. While slight clamping action of the jaws may occur as a result of taper 34 riding over taper 36, this will not prevent proper movement of the jaws in or into the collar.

In Fig. 1, it is possible that the parts may be arranged and constructed that the shoulders 33 would initially be fully positioned in recess 35, in which event the left end of the jaws would be less expanded, although the latter are always slightly expanded when they ride into contact with the collar surface 42, and this slight expansion might even be caused by taper 34 riding over 36, although normally the left ends will be slightly expanded regardless of the latter factor. Fig. 2 shows a smaller size of bar stock than that shown by Fig. 1, which results in the jaws and pads being farther inward.

As has been stated previously, it is desirable that the pusher have some overthrow in the feeding direction. Hence, the work piece will engage the stop in the machine, indicated at 48, before the sleeve stops moving. When this happens, it is quite apparent that the sleeve may ride over the collar 41 and jaws 15 and 16, or in other words the spring 43 will allow the jaws and collar to move to the left relative to the sleeve. Normally perhaps, the sleeve may not ride over the jaws and collar sufficiently to move surface 37 past the jaw shoulders 33, but if such movement is necessary, the shoulders 33 will drop into the sleeve recess 39, and this action will release the jaws and pads from the work piece sufficiently to allow rather easy passage of the jaws and pads over the stock.

When the sleeve movement is reversed, the jaws will tend to remain stationary, and as a result, relatively move toward the right end of the sleeve in a manner to release the jaws and pads sufficiently that they will then ride with the sleeve smoothly and rather easily over the bar stock. This will occur even though the jaw shoulders slip into recess 39, it being apparent that the taper 38 will facilitate such relative movement of the jaws and sleeve. The collar and spring acting in a follow up movement manner will not prevent the desired release of jaws and pad.

In the construction shown by Fig. 5, a very similar arrangement is provided with the exception that the pads and jaws are integral, as indicated at 50. As the jaws are actuated in the same manner as the jaws in the construction shown by Fig. 1, it is apparent that their inner peripheral surfaces for engaging the work piece will move against the work piece in the same manner that the jaws in the other construction operates. The manner in which the jaws operate causes both end portions of the jaws to contract in such manner that substantial axial contact between the jaws and work piece is obtained, in contrast to circumferential line contact. Normally this substantial axial contact is toward the left end portion of the jaws, but it is apparent that as the jaws are worn, more and more surface will engage the work piece, or in other words, the gripping surfaces of the jaws axially contacting with the work piece will increase as wear occurs. In other respects the operation of the pusher illustrated by Fig. 5 is substantially the same as that illustrated by Figs. 1 to 4 inclusive.

The construction shown by Fig. 5 is particularly adapted for sizes of stock larger than those which can be accommodated by the construction shown by Fig. 1. It should be apparent however that pads having different sizes of openings for the work may be used, to still further enlarge the range of sizes of stock which may be accommodated. However, in this case, as the size of work became larger, it would be necessary to make the jaws or pads or both, thinner, thereby weakening one or both sets of elements. Thus, to avoid undesirably thin elements, they may be combined and an integral jaw and pad used as shown in Fig. 5.

Either arrangement is such that the work piece may easily enter between the pads from the right end of the sleeve, a considerable distance without binding therein, and this is desirable after the final end of the work piece leaves the pusher. When this is the case, the next feeding movement of the pusher will cause the latter to engage the end of the work piece, and possibly between the pads, but as stated before, without binding.

A stock pusher such as shown by Fig. 1 is of such construction that the pads will have full length contact with the work piece at all times by reason of the substantially line contact between the pads and the jaws. Moreover, it is apparent that the operation of the device is such that firm gripping of the work piece will be immediately secured and the contact is such that slipping of the pads with respect to the work piece is practically eliminated. Furthermore, it is apparent when the work piece positively engages the stop in the machine, and the pusher is being actuated by a positive mechanism of non-yielding character, that the sleeve 10 may move past the jaws, pads and collar 41 as a result of the spring mounting of the latter and that such relative movement, if continued, will finally cause the jaw portions 33 to drop into the recess 39, to release the pads from the work piece sufficiently to permit free sliding of the pads on the latter.

The character of the devices illustrated, readily permits the pads and jaw members to accommodate work pieces varying considerable in diameter and hence substitution of one stock pusher or part for another when variations occur in sizes of work pieces is not necessary. Hence the stock pusher has greater efficiency because it will accommodate various sizes of work pieces that ordinary types of stock pushers could not accommodate without substitution of parts. Because of the positive gripping action between the pads and work piece, slipping of the work piece in the pads will not occur, and this feature either singly or in conjunction with preferred surface contact between the pads and work piece will prevent marring or scratching of the latter, as well as increase the durability of the gripping elements.

In general the invention provides a stock pusher which has a full or substantial length and constant contact with the work piece, and positive gripping action therewith, for the purpose of accurately moving the work piece the increment desired during movement of the feed pusher sleeve. Moreover, the invention provides a stock pusher which can be released from the work piece whenever this is necessary such as in the event the work piece runs into a positive abutment and the mechanism for moving the stock pusher has a positive and unyielding movement and has not completed its feed movement. In using a stock pusher of the type described, it is apparent that the ends of the work piece need not be chamfered or otherwise filed in order to permit inserting the work piece into the pusher, and the work piece may be readily inserted between the pads by hand and without difficulty, even though burrs are present on such work piece. This is extremely advantageous from an operating point of view.

In either construction, it is apparent that the work piece is and may be gripped close to the end of the sleeve 10. Hence when the left end of the work piece passes through the pusher, the latter may grip practically the extreme left end of the work piece close to the right end of the sleeve 10, thus eliminating much waste stock that would occur if the pusher could grip the stock only at a point considerably spaced from the right end of the sleeve 10.

Although more than one form of the invention has been described in detail, it will be apparent to those skilled in the art that various modifications may be provided without departing from the scope of the appended claims.

I claim:

1. A stock pusher comprising a sleeve, a plurality of axially extending clamping pads in the sleeve and adapted to grip a work piece extending through the sleeve, circumferentially disposed jaw members between the pads and sleeve, said pads engaging such jaw members and being rockable in axial planes, with respect to the jaw members, and means for effecting radial contraction of the jaw members and hence of the pads upon moving the sleeve in one direction axially of the work piece.

2. A stock pusher comprising a sleeve, a plurality of axially extending clamping members in the sleeve and adapted to grip or clamp a work piece extending through the sleeve, jaw members between the clamping members and the inner surface of the sleeve, and wedge means in the sleeve adapted to move over ends of the jaw members and contract them radially upon moving the sleeve axially in one direction.

3. A stock pusher comprising a sleeve, a plurality of axially extending clamping members in the sleeve and adapted to grip or clamp a work piece extending through the sleeve, jaw members between the clamping members and the inner surface of the sleeve, and wedge means in the sleeve adapted to move over ends of the jaw members and contract them radially upon moving the sleeve axially in one direction, said wedge means being resiliently mounted to limit contraction of the jaw members.

4. A stock pusher comprising a sleeve, a plurality of jaw members in the sleeve and extending axially thereof, clamping pads between the jaw members and adapted to have substantially full length engagement with a piece extending therebetween, said pads being rockable in axial planes with respect to the jaw members, spring means normally tending to contract the jaw members and hence the pads, and means in the sleeve for positively contracting the jaws and pads radially, upon moving the sleeve axially of the work piece in one direction.

5. A stock pusher comprising a sleeve, a plurality of axially extending clamping pads in the sleeve and adapted to grip a work piece extending therethrough, radially contractile means between the pads and the inner periphery of the sleeve and movable axially of the latter for contracting the pads about the work piece, and means for radially contracting said means upon moving the sleeve in one axial direction.

6. A stock pusher comprising a sleeve, a plurality of axially extending clamping pads in the sleeve and adapted to grip a work piece extending therethrough, radial contractile means between the pads and the inner periphery of the sleeve and movable axially of the latter for contracting the pads about the work piece upon moving the sleeve in one direction axially thereof, means allowing rocking movement of the pads in axial planes without interfering with the operation of the radial contractile means, to enable automatic adjustment of the pads with respect to the work piece, and means for causing contraction of the radially contractile means and contraction of the pads about the work piece, upon moving the sleeve in one axial direction.

7. A stock pusher comprising a sleeve, a plurality of axially extending clamping pads in the sleeve and adapted to grip a work piece extending therethrough, means between the pads and the inner periphery of the sleeve and movable axially of the latter for contracting the pads about the work piece upon moving the sleeve in one direction axially thereof, said pads having only substantially line contact with said means in a circumferential direction, and means for causing contraction of the first means upon moving the sleeve in such direction, to cause contraction of the pads while at the same time enabling rocking movement of the pads about the substantially line contact and hence alignment thereof with the work piece.

8. A stock pusher comprising a sleeve, a plurality of axially extending clamping pads in the sleeve and adapted to grip a work piece, radially contractile means between the pads and inner periphery of the sleeve and having substantially only circumferential line contact with the outer surface of the pads substantially midway between their ends, so as to permit rocking movement of the pads and hence alignment thereof with the work piece, and means for causing contraction of said first means upon moving the sleeve in one direction.

9. A stock pusher comprising a sleeve, a plurality of axially extending clamping pads in the sleeve and adapted to grip a work piece extending through the sleeve, means between and engaging the pads and inner periphery of the sleeve for contracting the pads about the work piece upon moving the sleeve in one direction axially of the work piece, said engagement between said means and the pads being such that the pads are rockable in axial planes, and means in the sleeve and engageable with the first means for contracting the latter and hence the pads, upon movement of the sleeve in one direction.

10. A stock pusher comprising a sleeve, a plurality of clamping members movable axially in the sleeve, and adapted to grip and move a work piece extending through the sleeve, means adapted upon moving the sleeve axially, relative to the clamping members to cause the clamping members to strongly grip the work piece and then move it with the sleeve, and means for releasing the clamping members upon a continuation of the sleeve movement and after the work piece is gripped, in the event the work piece is impeded in its movement, such as by engaging a stop.

11. A stock pusher comprising a sleeve, a plurality of axially elongated clamping members in the sleeve, means rockably mounting the clamping members at one end for independent rocking movement in axial planes, means normally urging the other ends of the clamping members toward each other for lightly gripping a work piece disposed between them, and means in the sleeve adapted to cooperate with the clamping members when the sleeve is moved in one direction, for strongly urging such clamping members together to positively grip the work piece.

12. A stock pusher comprising a sleeve, a plurality of clamping members extending and movable longitudinally in the sleeve and adapted to grip a work piece extending therebetween, means in the sleeve for cooperating with the clamping members at one end thereof and causing their contraction and hence clamping of the work piece upon movement of the sleeve relative to the clamping members in one direction, means in the sleeve at the other ends of the clamping members for normally preventing their radial expansion during the stock pushing operation, and means in the sleeve for permitting expansion of the latter ends of the clamping members and hence substantial release thereof from the work piece, upon a predetermined movement of the clamping members relative to the sleeve such as may occur when the sleeve is being moved in the stock pushing operation and movement of the work piece is suddenly and strongly impeded.

13. A stock pusher comprising a sleeve, a plurality of axially elongated clamping members in the sleeve, means in the sleeve for contracting the clamping members about a work piece extending therethrough, upon movement of the sleeve relative to the clamping member in one direction, means in the sleeve adjacent one end of the clamping members for initially allowing radial expansion thereof so as to readily permit the insertion of a work piece through the clamping members, means adjacent the last mentioned means for insuring clamping action of the clamping members upon a predetermined relative movement of the sleeve with respect thereto, during the stock pushing operation, and means adjacent the last mentioned means for releasing the clamping members in the event during stock pushing operation, movement of the work piece is strongly impeded.

14. A stock pusher comprising a sleeve, clamping members movable axially in the sleeve, means in the sleeve for radially contracting the clamping members about a work piece projecting therethrough upon moving the sleeve in one direction and relative to the clamping members, whereby upon moving the sleeve in such direction, it moves in an axial direction relative to the clamping members and upon clamping engagement with the stock piece, causes movement of the latter with the sleeve, and means for releasing the clamping members from clamping engagement with the stock piece, upon a further movement of the sleeve relative to the clamping members such as may occur in the event movement of the stock piece is strongly impeded and the sleeve continues to move.

15. A stock pusher comprising a sleeve, a plurality of clamping members of elongated character, movably mounted in the sleeve for axial movement therein, means normally urging the clamping members at one end into engagement with a work piece extending through the sleeve and through the clamping members, means in the sleeve for further causing contraction of the clamping members about the stock piece when the sleeve is moved in one direction relative to such clamping members whereby the stock piece will be positively gripped for movement with the sleeve, and means for releasing the clamping members from engagement with the stock piece in the event the sleeve continues to move and the stock piece engages a positive abutment.

16. A stock pusher comprising a sleeve, clamping members in the sleeve for engaging a work piece extending therethrough, means in the sleeve for contracting the clamping members about and moving the work piece when the sleeve is moved in one direction and after a relative movement of the sleeve with respect to the clamping members, and means for releasing the clamping members from the work piece in the event the sleeve continues to move in such direction and the work piece engages an abutment.

17. A stock pusher comprising a sleeve, a plurality of clamping means disposed in and movable axially of the sleeve, and having central open portions through which a work piece may pass, means lightly and normally tending to radially contract the members, and means in the sleeve for more forcefully contracting the members upon movement of the sleeve axially in one direction relative to the clamping members.

18. A stock pusher comprising a sleeve, a plurality of clamping members disposed in and movable axially of the sleeve and having central open portions through which a work piece may pass, means lightly and normally tending to contract the members, axially movable and spring pressed means in the sleeve for forcefully contracting the members upon movement of the members in the sleeve in one direction relative to the latter, and means on the sleeve for limiting movement of the spring pressed means so as to enable operatively separating the latter with respect to the clamping members upon a reverse movement of the latter in the sleeve.

19. A stock pusher comprising a sleeve, a collar slidable axially in the sleeve and having an axially tapered surface, a spring normally urging the collar towards one end of the sleeve, means on the sleeve for limiting such movement of the collar, and clamping members movable axially in the sleeve and having portions adapted to move over the tapered surface on the collar when the members are moved towards such collar and relative to the sleeve.

20. A stock pusher comprising a sleeve, a plurality of elongated clamping members in the sleeve, spring means normally and lightly tending to radially contract the clamping members at one end, means in the sleeve adapted to cooperate with said ends of the clamping members for more forcefully and radially contracting them upon movement of the sleeve relative to the clamping members in one direction, and means on the sleeve and adapted to cooperate with the other ends of the clamping members for normally holding them against radial outward movement during the stock pushing operation.

GUSTAV ARTHUR GUSTAFSON.